(12) United States Patent
Ha et al.

(10) Patent No.: US 10,753,350 B2
(45) Date of Patent: Aug. 25, 2020

(54) LINEAR COMPRESSOR

(71) Applicant: LG ELECTRONICS INC., Seoul (KR)

(72) Inventors: Dongkyun Ha, Seoul (KR); Chulgi Roh, Seoul (KR); Sangeun Bae, Seoul (KR); Sangmin Lee, Seoul (KR); Kiil Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 15/801,474

(22) Filed: Nov. 2, 2017

(65) Prior Publication Data
US 2019/0032649 A1    Jan. 31, 2019

(30) Foreign Application Priority Data
Jul. 31, 2017 (KR) .................. 10-2017-0097357

(51) Int. Cl.
*F04B 39/00* (2006.01)
*F04B 39/12* (2006.01)
(Continued)

(52) U.S. Cl.
CPC ........ *F04B 39/0044* (2013.01); *F04B 35/045* (2013.01); *F04B 39/121* (2013.01);
(Continued)

(58) Field of Classification Search
CPC ................ F04B 39/102; F04B 39/1026; F04B 39/0044; F04B 39/14; F04B 39/127;
(Continued)

(56) References Cited

U.S. PATENT DOCUMENTS 6,435,841 B1 * 8/2002 Kim .................... F04B 39/0033
417/312
2003/0133812 A1 7/2003 Puff et al.
(Continued)

FOREIGN PATENT DOCUMENTS

| CN | 1585857 | 2/2005 |
|---|---|---|
| CN | 106089632 | 11/2016 |

(Continued)

OTHER PUBLICATIONS

European Search Report dated May 3, 2018 issued in Application No. 17196587.4.
(Continued)

*Primary Examiner* — Devon C Kramer
*Assistant Examiner* — Christopher J Brunjes
(74) *Attorney, Agent, or Firm* — Ked & Associates LLP (57) ABSTRACT

A linear compressor is provided that may include a shell having a cylindrical shape, a compressor main body inserted into the shell, a first shell cover coupled to a rear end of the shell, a first support coupled to a front end of the compressor main body that supports the front end of the compressor main body, and a second support that couples a rear end of the compressor main body to the first shell cover and supports the rear end of the compressor main body. The first support may include a support head coupled to a center of the front end of the compressor main body, and a pair of dampers having both ends respectively coupled to the support head and an inner circumferential surface of the shell.

16 Claims, 8 Drawing Sheets

(51) Int. Cl.
    *F04B 35/04* (2006.01)
    *F04B 39/14* (2006.01)
    *F16F 15/067* (2006.01)
(52) U.S. Cl.
    CPC .......... *F04B 39/123* (2013.01); *F04B 39/127* (2013.01); *F04B 39/14* (2013.01); *F04B 35/04* (2013.01); *F16F 15/067* (2013.01)
(58) Field of Classification Search
    CPC .............. F04B 39/0088; F04B 39/0083; F04B 39/121; F04B 39/123; F04B 49/03; F04B 35/04; F04B 35/045; F16F 15/067
    USPC .......................................... 417/296, 435, 440
    See application file for complete search history.

(56) References Cited

U.S. PATENT DOCUMENTS

| | | | | |
|---|---|---|---|---|
| 2004/0247466 | A1* | 12/2004 | Lee | F04B 25/005 |
| | | | | 417/415 |
| 2005/0053489 | A1 | 3/2005 | Noh et al. | |
| 2005/0175482 | A1* | 8/2005 | Park | F04B 35/045 |
| | | | | 417/416 |
| 2006/0251529 | A1* | 11/2006 | Kim | F04B 35/045 |
| | | | | 417/417 |
| 2010/0133733 | A1* | 6/2010 | Cappeller | F04B 39/0044 |
| | | | | 267/140.5 |
| 2015/0184651 | A1* | 7/2015 | Ki | F04B 17/03 |
| | | | | 417/349 |
| 2016/0195079 | A1* | 7/2016 | Miguel | F04B 39/0027 |
| | | | | 92/161 |

FOREIGN PATENT DOCUMENTS

| | | |
|---|---|---|
| DE | 10-2013-215033 | 2/2015 |
| EP | 0 145 058 | 6/1985 |
| JP | H 11-117861 | 4/1999 |
| KR | 10-2003-0044671 | 6/2003 |
| KR | 10-2006-0091644 | 8/2006 |
| KR | 20060091644 A * | 8/2006 |
| KR | 10-2016-0000403 | 1/2016 |

OTHER PUBLICATIONS

Chinese Office Action dated Jul. 9, 2019 with English Translation.

* cited by examiner

LINEAR COMPRESSOR

CROSS-REFERENCE TO RELATED APPLICATION(S)

The present application claims the benefits of priority to Korean Patent Application No. 10-2017-0097357 filed in Korea on Jul. 31, 2017, which is herein incorporated by reference in its entirety.

BACKGROUND

1. Field

A linear compressor is disclosed herein.

2. Background

In general, compressors are machines that receive power from a power generation device, such a an electric motor or a turbine, to compress air, a refrigerant, or various working gases, thereby increasing a pressure. Compressors are being widely used in home appliances or industrial fields.

Compressors may be largely classified into reciprocating compressors in which a compression space into and from which a working gas, such as a refrigerant, is suctioned and discharged is defined between a piston and a cylinder to allow the piston to linearly reciprocate into the cylinder, thereby compressing the refrigerant, rotary compressors in which a compression space into and from which a working gas, such as a refrigerant, is suctioned or discharged is defined between a roller that eccentrically rotates and a cylinder to allow the roller to eccentrically rotate along an inner wall of the cylinder, thereby compressing the refrigerant, and scroll compressors in which a compression space into and from which a work gas, such as a refrigerant, is suctioned or discharged is defined between an orbiting scroll and a fixed scroll to compress the refrigerant while the orbiting scroll rotates along the fixed scroll. In recent years, a linear compressor, which is directly connected to a drive motor, in which a piston linearly reciprocates to improve compression efficiency without mechanical loss due to motion conversion and having a simple structure, has been widely developed.

In general, the linear compressor suctions and compresses a refrigerant within a sealed shell while a piston is linearly reciprocated within a cylinder by a linear motor and then discharges the compressed refrigerant. The linear motor includes a permanent magnet disposed between an inner stator and an outer stator. The permanent magnet is driven to linearly reciprocate by electromagnetic force between the permanent magnet and the inner (or outer) stator. As the permanent magnet operates in a state in which the permanent magnet is connected to the piston, the piston suctions and compresses the refrigerant while linearly reciprocating within the cylinder and then the compressed refrigerant is discharged.

A structure of a linear compressor is disclosed in the following related art.

As disclosed in Korean Patent Application Publication No. 2016-0000403, published on Jan. 4, 2016 and hereby incorporated by reference, a related art linear compressor has a structure in which a compressor main body is provided in a shell having a cylindrical shape, and a front end and a rear end of the compressor main body are respectively supported by plate springs. The linear compressor in which the front end and the rear end are supported by the two plate springs has the following problems.

First, a large number of components including a plurality of bolts are required to connect the plate springs to the compressor main body and an inner circumferential surface of the shell, resulting in an increase in material costs. Second, due to the large number of components, it takes a lot of time to perform an assembling work, and a probability of a bolting fault is high because the plate springs and the shell are connected together by the bolts. Third, a plate spring support structure is inferior in noise and vibration absorption capability, as compared with a coil spring support structure.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a linear compressor to which a coupling structure of a cylinder and a frame is applied according to an embodiment will be described with reference to the accompanying drawings.

Figure 1:
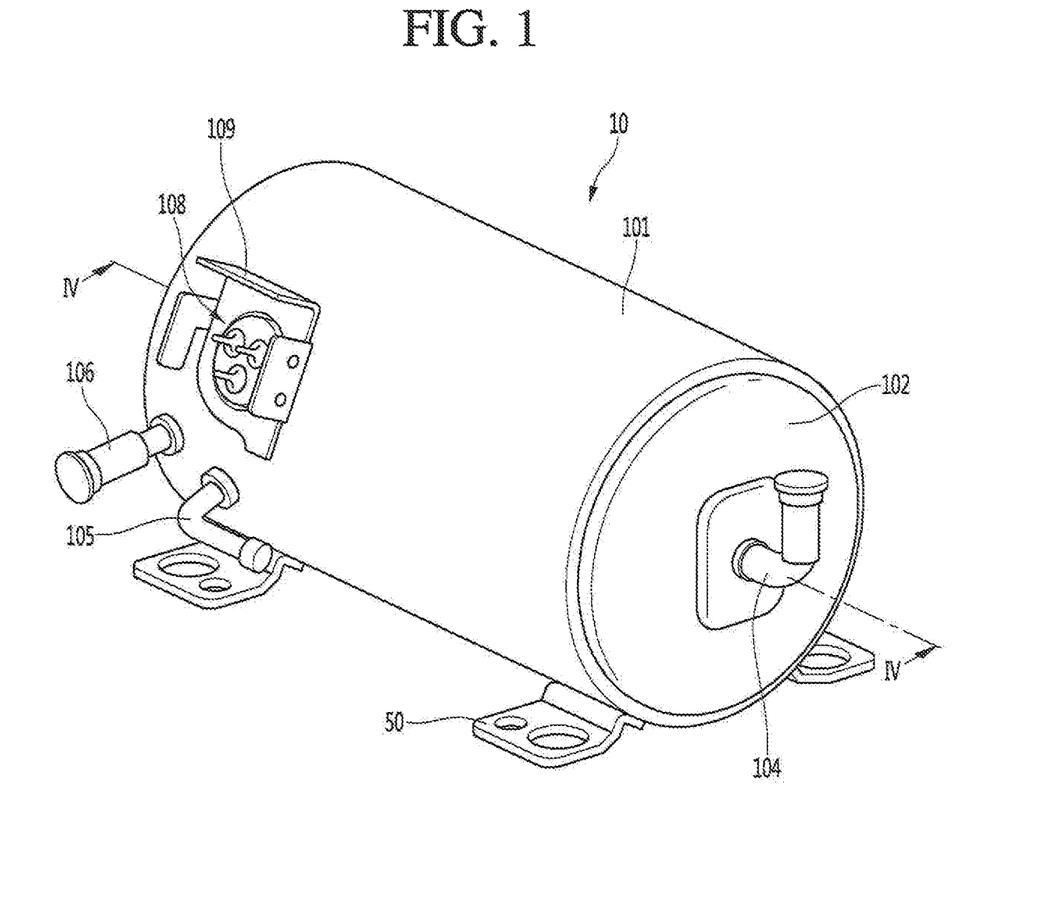
FIG. 1 is a perspective view illustrating an outer appearance of a linear compressor according to an embodiment.
Figure 2:
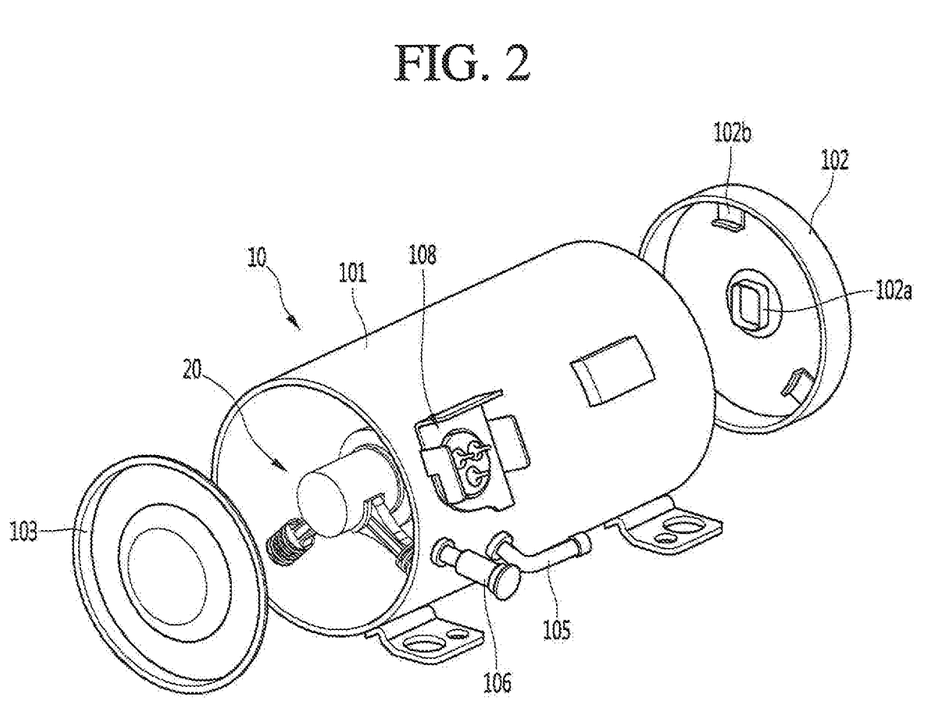
FIG. 2 is an exploded perspective view illustrating a shell and a shell cover of the linear compressor according to an embodiment.

FIG. 1 is a perspective view illustrating an outer appearance of a linear compressor according to an embodiment. FIG. 2 is an exploded perspective view illustrating a shell and a shell cover of the linear compressor according to an embodiment.

Referring to FIGS. 1 and 2, a linear compressor 10 according to an embodiment may include a shell 101 and a shell cover coupled to the shell 101. The shell cover may include a first shell cover 102 and a second shell cover 183. Each of the shell covers 102 and 103 may be understood as one component of the shell 101.

A leg 50 may be coupled to a lower portion of the shell 101. The leg 50 may be coupled to a base of a product in which the linear compressor 10 is installed or provided. For example, the product may include a refrigerator, and the base may include a machine room base of the refrigerator. For another example, the product may include an outdoor unit of an air conditioner, and the base may include a base of the outdoor unit.

The shell 101 may have a laid-out cylindrical shape. Thus, when the linear compressor 10 is, installed on the machine room base of the refrigerator, the machine room may be reduced in height. The shell 101 may have a cylindrical shape; however, embodiments are not invited thereto.

A terminal block 108 may be installed or provided on or at an outer surface of the shell 101. The terminal block 108 may be understood as a connection part that transmits external power to a motor assembly (see reference numeral 140 of FIG. 3) of the linear compressor 10.

A bracket 109 may be installed or provided outside the terminal block 108. The bracket 109 may protect the terminal block 108 against an external impact.

Both ends of the shell 101 may be open. The first and second shell covers 102 and 103 may be coupled to both ends of the shell 101. An inner space of the shell 101 may be, sealed by the shell covers 102 and 103.

In FIG. 1, the first shell cover 102 may be disposed or provided at a first portion or a rear end (right in FIG. 1) of the linear compressor 10, and the second shell cover 103 may be disposed or provided at a second portion or a front end (left in FIG. 1) of the linear compressor 10. That is, the first and second shell covers 102 and 103 may be disposed to face each other.

The linear compressor 10 may further include a plurality of pipes 104, 105, and 106 provided in the shell 101 or the shell covers 102 and 103 to suction and discharge a refrigerant. The plurality of pipes 104, 105, and 106 may include a suction pipe 104, through which the refrigerant may be suctioned into the linear compressor 10, a discharge pipe 105, through which the compressed refrigerant may be discharged from the linear compressor 10, and a process pipe, through which the refrigerant may be supplemented to the linear compressor 10.

For example, the suction pipe 104 may be coupled to the first shell cover 102. The refrigerant may be suctioned into the linear compressor 10 through the suction pipe 104 in an axial direction.

The discharge pipe 105 may be coupled to an outer circumferential surface of the shell 101. The refrigerant suctioned through the suction pipe 104 may flow in the axial direction and then be compressed. The compressed refrigerant may be discharged through the discharge pipe 105. The discharge pipe 105 may be disposed at a position which is adjacent to the second shell cover 103 rather than the first shell cover 102.

The process pipe 106 may be coupled to an outer circumferential surface of the shell 101. A worker may inject the refrigerant into the linear compressor 10 through the process pipe 106.

The process pipe 106 may be coupled to the shell 101 at a height different from a height of the discharge pipe 105 to avoid interference with the discharge pipe 105. The term "height" may be understood as a distance from the leg 50 in a vertical direction (or a radial direction). As the discharge pipe 105 and the process pipe 106 are coupled to the outer circumferential surface of the shell 101 at heights different from each other, a worker's work convenience may be improved.

Figure 3:
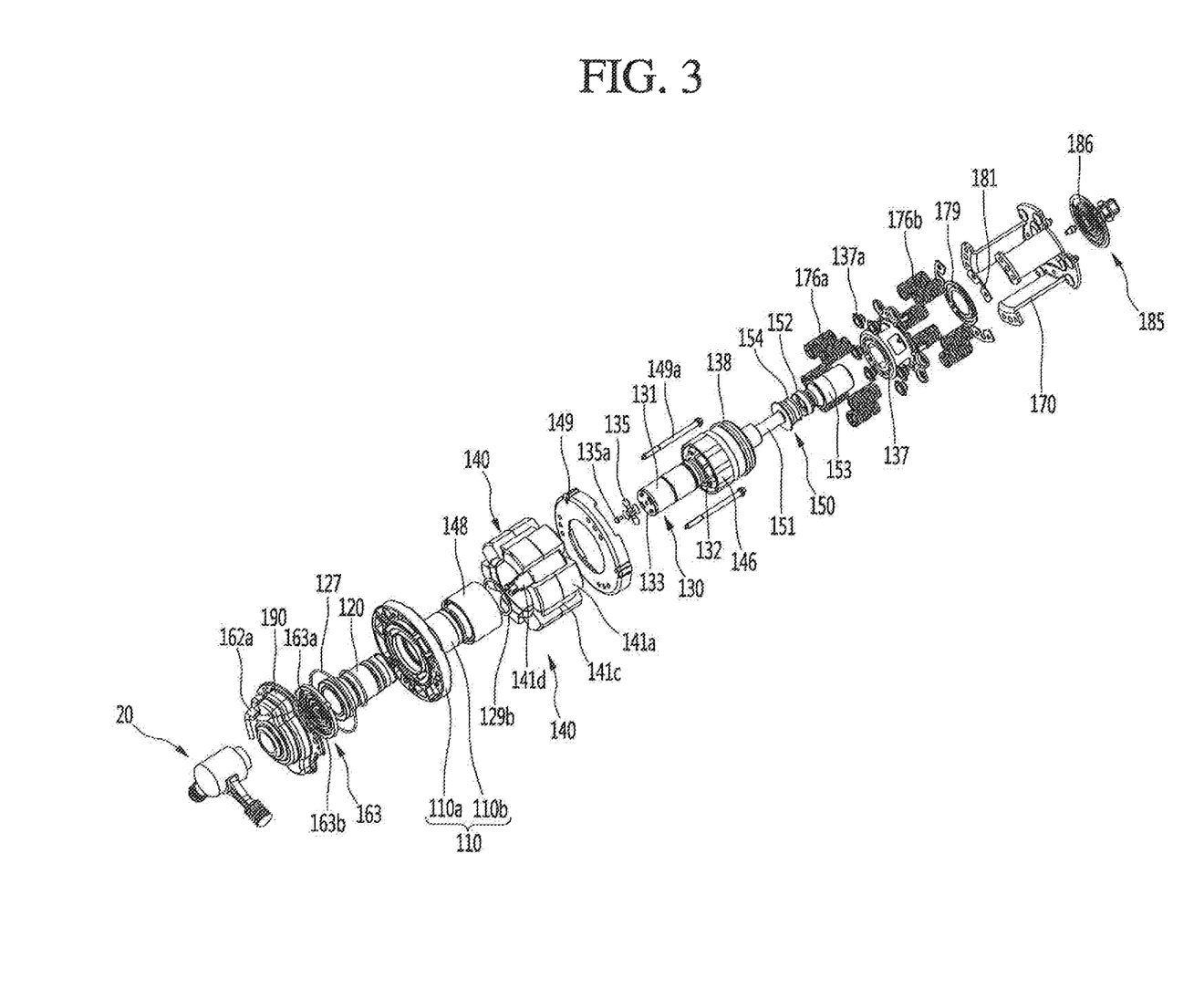
FIG. 3 is an exploded perspective view illustrating a main body of the linear compressor according to an embodiment.
Figure 4:
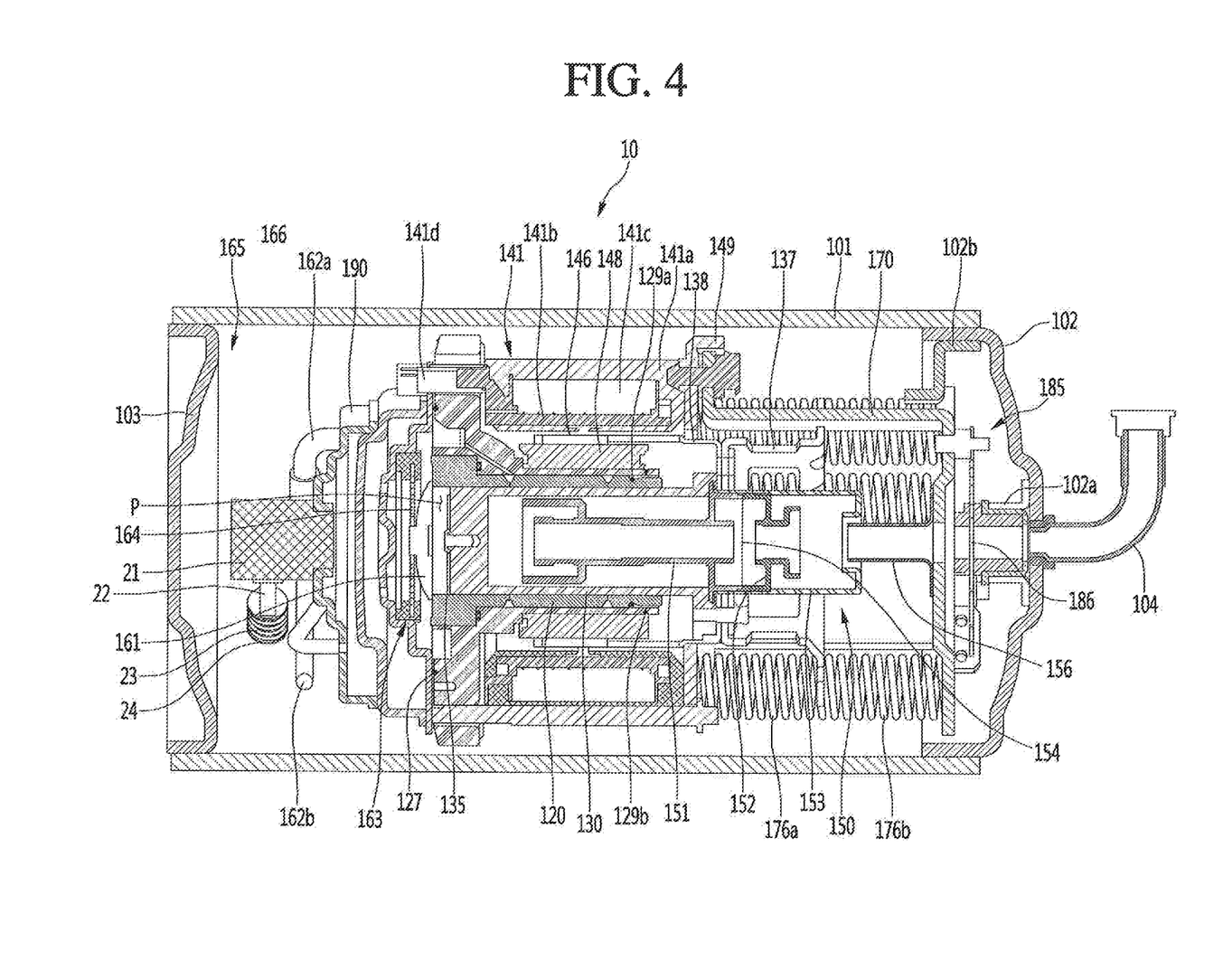
FIG. 4 is a longitudinal cross-sectional view of the linear compressor, taken along line IV-IV of FIG. 1, according to an embodiment.

A cover support part or support 102a may be disposed or provided on an inner surface of the first shell cover 102. A second support device or support 185, which will be described hereinafter, may be coupled to the cover support part 102a. The cover support part 102a and the second support device 185 may be understood as devices that support a main body of the linear compressor 10. The main body of the compressor represents a component set provided in the shell 101. For example, the main body may include a drive part or drive that reciprocates forward and backward and a support part or support that supports the drive part. As illustrated in FIGS. 3 and 4, the drive part may include components, such as a piston 130, a magnet frame 138, a permanent magnet 146, a support 137, and a suction muffler 150. The support part may include components, such as resonant springs 176a and 176b, a rear cover 170, a stator cover 149, the first support device or support 20, and the second support device 185.

A stopper 102b may be disposed or provided on the inner surface of the first shell cover 102. The stopper 102b may be understood as a component that prevents the main body of the compressor, particularly, the motor assembly 140 from being bumped by the shell 101 and thus damaged due to vibration or impact occurring during transportation of the linear compressor 10. The stopper 102b may be disposed adjacent to the rear cover 170, which is described hereinafter. Thus, when the linear compressor 10 is shaken, the rear cover 170 may interfere with the stopper 102b to prevent the impact from being transmitted to the motor assembly 140.

FIG. 3 is an, exploded perspective view illustrating the main body of the linear compressor according to an embodiment. FIG. 4 is a longitudinal cross-sectional view of the linear compressor, taken along line IV-IV of FIG. 1, according to an embodiment.

Referring to FIGS. 3 and 4, the main body of the linear compressor 10, which is provided in the shell 101 according to an embodiment may include a frame 110, a cylinder 120 inserted into a center of the frame 110, a piston 130 linearly reciprocated within the cylinder 120, and motor assembly 140 that applies a drive force to the piston 130. The motor assembly 140 may be a linear motor that allows the piston 130 to linearly reciprocate in the axial direction of the shell 101.

The linear compressor 10 may include a suction muffler 150. The suction muffler 150 may be coupled to the piston 130 and configured to reduce noise generated from the refrigerant suctioned through the suction pipe 104. The refrigerant suctioned through the suction pipe 104 may flow into the piston 130 via the suction muffler 150. For example, while the refrigerant passes through the suction muffler 150, the flow noise of the refrigerant may be reduced.

The suction muffler 150 may include a plurality of mufflers. The plurality of mufflers may include a first muffler 151, a second muffler 152, and a third muffler 153, which may be coupled to each other. The first muffler 151 may be disposed ear provided within the piston 130, and the second muffler 152 may be coupled to a rear end of the first muffler 151. The third muffler 153 may accommodate the second muffler 152 therein and have a front end coupled to the rear end of the first muffler 151. In view of a flow direction of the refrigerant, the refrigerant suctioned through the suction pipe 104 may successively pass through the third muffler 153, the second muffler 152, and the first muffler 151. In this process, the flow noise of the refrigerant may be reduced.

A muffler filter 154 may be further installed or provided in the suction muffler 150. The muffler filter 154 may be disposed or provided on or at an interface on or at which the first muffler 151 and the second muffler 152 are coupled to each other. For example, the muffler filter 154 may have a circular shape, and may be disposed and supported between coupling surfaces of the first and second mufflers 151 and 152.

The term "axial direction" may refer to a direction in which the piston 130 reciprocates, that is, an extension direction of a longitudinal central axis of the cylindrical shell 101. Also, "in the axial direction" may be a direction in which is directed from the suction pipe 104 toward a compression space P, that is, a direction in which the refrigerant flows may be defined as a "frontward direction", and a direction opposite to the frontward direction may be defined as a "rearward direction". When the piston 130 moves forward, the compression space P may be compressed. The term "radial direction" may refer to a radial direction of the shell 101, that is, a direction which is perpendicular to the direction in which the piston 130 reciprocates.

The piston 130 may include a piston body 131 having an approximately cylindrical shape and a piston flange part or flange 132 that extends from the rear end, of the piston body 131 in the radial direction. The piston body 131 may reciprocate within the cylinder 120, and the piston flange part 132 may reciprocate outside of the cylinder 120. The piston body 131 may accommodate at least a portion of the first muffler 151.

The cylinder 120 has the compression space P in which the refrigerant is compressed by the piston 130. A plurality of suction holes 133 may be defined in positions which are spaced a predetermined distance from a center of a front surface of the piston body 131 in the radial direction.

The plurality of suction holes 133 may be spaced apart from each other in a circumferential direction of the piston 130, and the refrigerant may be introduced into the compression space P through the plurality of suction holes 133. The plurality of suction holes 133 may be spaced a predetermined distance from each other in a circumferential direction of a front surface of the piston 130, and a plurality of groups of the suction holes 133 may be provided.

A suction valve 135 that selectively opens the suction hole 133 may be provided at a front side of each of the suction holes 133. The suction valve 135 may be fixed to the front surface of the piston body 131 through a coupling member 135a, such as a screw or a bolt.

A discharge cover 190 that defines a discharge space for the refrigerant discharged from the compression space P and a discharge valve assembly coupled to the discharge cover 190 to discharge the refrigerant compressed in the compression space P to the discharge space may be provided at a front side of the compression space P. The discharge cover 190 may be provided in a shape in which a plurality of covers is laminated. A coupling hole or a coupling groove, to which the first support device 20, which is described hereinafter, is to be coupled, may be defined in a center of the discharge cover 190 coupled to an outermost (or foremost) cover among the plurality of covers.

The discharge valve assembly may include a discharge valve 161 and a spring assembly 163 that provides elastic force in a direction in which the discharge valve 161 is closely attached to the front end of the cylinder index 120. When a pressure within the compression space P is above a discharge pressure, the discharge valve 161 may be separated from a front surface or end of the cylinder 120 to discharge the compressed refrigerant to the discharge space defined by the discharge cover 190. Also, when the pressure within the compression space P is above the discharge pressure, the spring assembly 163 may be contracted to allow the discharge valve 161 to be spaced apart from the front end of the cylinder 120.

The spring assembly 163 may include a valve spring 163a and a spring support part or support 163b that supports the valve spring 163a to the discharge cover 190. For example, the valve spring 163a may include a plate spring. The discharge valve 161 may be coupled to the valve spring 163a, and a rear portion or a rear surface of the discharge valve 161 may be closely attached and supported on the front surface (or the front end) of the cylinder 120.

When the discharge valve 161 is supported on the front surface of the cylinder 120, the compression space P may be maintained in a sealed state. When the discharge valve 161 is spaced apart from the front surface of the cylinder 120, the compression space P may be opened to allow the refrigerant in the compression space P to be discharged.

The compression space P may be understood as a space defined between the suction valve 135 and the discharge valve 161. Also, the suction valve 135 may be disposed or provided at one or a first side of the compression space P, and the discharge valve 161 may be disposed or provided at the other or a second side of the compression space P, that is, an opposite side of the suction valve 135.

While the piston 130 linearly reciprocates within the cylinder 120, when the pressure within the compression space P is less than the suction pressure of the refrigerant, the suction valve 135 may be opened to allow the refrigerant to be introduced into the compression space P. On the other hand, when the pressure within the compression space P is above the suction pressure, the suction valve 135 is closed, and thus, the piston 130 moves forward to compress the refrigerant within the compression space P.

When the pressure within the compression space P is greater than the pressure (discharge pressure) of the firsts discharge space, the valve spring 163a is deformed forward to allow the discharge valve 161 to be spaced apart from the cylinder 120. Also, the refrigerant within the compression space P is discharged into the discharge space through a gap between the discharge valve 161 and the cylinder 120. When the discharge of the refrigerant is completed, the valve spring 163a may provide a restoring force to the discharge valve 161 so that the discharge valve 161 is closely attached again to the front end of the cylinder 120.

The linear compressor 10 may further include a cover pipe 162a. The cover pipe 162a may be coupled to the discharge cover 190 to discharge the refrigerant flowing to the discharge space defined in the discharge cover 190 to the outside.

The linear compressor 10 may further include a loop pipe 162b. The loop pipe 162b may have one or a first end coupled to a discharge end of the cover pipe 162a and the other or a second end connected to the discharge pipe 105 provided ire the shell 101.

The loop pipe 162b may be made of a flexible material and have a length relatively longer than a length of the cover pipe 162a. Also, the loop pipe 162b may roundly extend from the cover pipe 162a along an inner circumferential surface of the shell 101 and be coupled to the discharge pipe 105.

The frame 110 may be understood as a component for fixing the cylinder 120. For example, the cylinder 120 may be inserted into a central portion of the frame 110. Also, the discharge cover 190 may be coupled to a front surface of the frame 110 by using the coupling member.

The motor assembly 140 may include an outer stator 141 fixed to the frame 110 to surround the cylinder 120, an inner stator 148 disposed to be spaced inward from the outer stator 141 and a permanent magnet 146 disposed in a space between the outer stator 141 and the inner stator 148. The permanent magnet 146 may be linearly reciprocated by mutual electromagnetic force between the outer stator 141 and the inner stator 148. Also, the permanent magnet 146 may be provided as a single magnet having one polarity or be configured by coupling a plurality of magnets having three polarities to each other.

The permanent magnet 146 may be disposed on the magnet frame 138. The magnet frame 138 may have an approximately cylindrical shape and be inserted into the space between the outer stator 141 and the inner stator 148.

The magnet frame 138 may be coupled to the piston flange part 132 to extend in the frontward direction (the axial direction). The permanent magnet 146 may be attached to a front end of the magnet frame 138 or an outer circumferential surface of the magnet frame 138. Thus, when the permanent magnet 146 reciprocates in the axial direction, the piston 130 may reciprocate together with the permanent magnet 146 in the axial direction.

The outer stator 141 may include coil winding bodies 141b, 141c, and 141d and a stator core 141a. The coil winding bodies 141b, 141c, and 141d may include a bobbin 141b and a coil 141c wound in a circumferential direction of the bobbin 141b. Also, the coil winding bodies 141b, 141c, and 141d may further include a terminal part or portion 141d that guides a power line connected to the coil 141c so that the power line is led out or exposed to the outside of the outer stator 141.

The stator core 141a may include a plurality of core blocks in which a plurality of laminations are laminated in a circumferential direction. The plurality of core blocks may surround at least a portion of the coil winding bodies 141b and 141c.

A stator cover 149 may be disposed on or at, one side of the outer stator 141. That is, the outer stator 141 may have one side supported by the frame 110 and the other side supported by the stator cover 149.

The linear compressor 10 may further include a cover coupling member 149a that couples the stator cover 149 to the frame 110. The cover coupling member 149a may pass through the stator cover 149 to extend forward to the frame 110 and then be coupled to the frame 110.

The inner stator 148 may be fixed to a circumference of the frame 110. Also, in the inner stator 148, the plurality of laminations may be stacked irk the circumferential direction outside of the frame 110.

The linear compressor 10 may further include the support 137 that supports a rear end of the piston 130. The support 137 may be coupled to a rear portion of the piston 130 and have a hollow part so that the muffler 150 may pass through an inside of the support 137. The piston flange part 132 the magnet frame 138, and the support 137 may be coupled to each other using a coupling member to form one body.

A balance weigh 179 may be coupled to the support 137. A weight of the balance weight 179 may be determined based on a drive frequency range of the compressor body.

The linear compressor 10 may further include a rear cover 170. The rear cover 170 may be coupled to the stator cover 149 to extend backward and be supported by the second support device 185.

The rear cover 170 includes three support legs, and the three support legs may be coupled to a rear surface of the stator cover 149. A spacer 181 may be disposed or provided, between the three support legs and the rear surface of the stator cover 149. A distance from the stator cover 149 to a rear end of the rear cover 170 may be determined by adjusting a thickness of the spacer 181. Also, the rear cover 170 may be spring-supported by the support 137.

The linear compressor 10 may further include an inflow guide part or guide 156 coupled to the rear cover 170 to guide an inflow of the refrigerant into the muffler 150. At least, a portion of the inflow guide part 156 may be inserted into the suction muffler 150.

The linear compressor 10 may include a plurality of resonant springs 176 which may be adjustable in natural frequency to allow the piston 130 to perform a resonant motion. The plurality of resonant springs may include a plurality of first resonant springs 176a supported between the support 137 and the stator cover 149 and a plurality of second resonant springs 176b supported between the support 137 and the rear cover 170. Due to the operation of the plurality of resonant springs, the compressor body may stably reciprocate within the shell 101 of the linear compressor 10 to minimize generation of vibration or noise due to movement of the compressor body.

The support 137 may include a first spring support part or support 137a coupled to the first resonant spring 176a.

The linear compressor 10 may include the frame 110 and a plurality of sealing members or seals that increases a coupling force between peripheral components around the frame 110. The plurality of sealing members may include first sealing member or seal 127 disposed or provided at a portion at which the frame 110 and the discharge cover 190 are coupled to each other. The plurality of sealing members may further include a third sealing member or seal 129a disposed or provided between the cylinder 120 and the frame 110. The plurality of sealing members may further include a second sealing member or seal 129b disposed or provided at a portion, at which the frame 110 and the inner stator 148 are coupled to each other. Each of the first to third sealing members 127, 129a, and 129b may have a ring shape.

The linear compressor 10 may further include the first support device 20 that supports the front end of the main body of the linear compressor 10. As shown in FIG. 4, the first support device 20 may be coupled to a coupling hole or a coupling groove defined in a front center of the discharge cover 190. A structure of the first support device 20 will be described hereinafter with reference to the drawings.

The linear compressor 10 may further include the second support device 185 that supports the rear end of the main body of the linear compressor 10. The second support device 185 may be coupled to the rear cover 170. The second support device 185 may be coupled to the first shell cover 102 to elastically support the main body of the compressor 10. The second support device 185 may include a support spring 186, and the support spring 186 may be coupled to the cover support part 102a.

The frame 110 may include a frame head 110a having a disk shape and a frame body 110b that extends from a center of a rear surface of the frame head 110a to accommodate the cylinder 120 therein.

Figure 5:
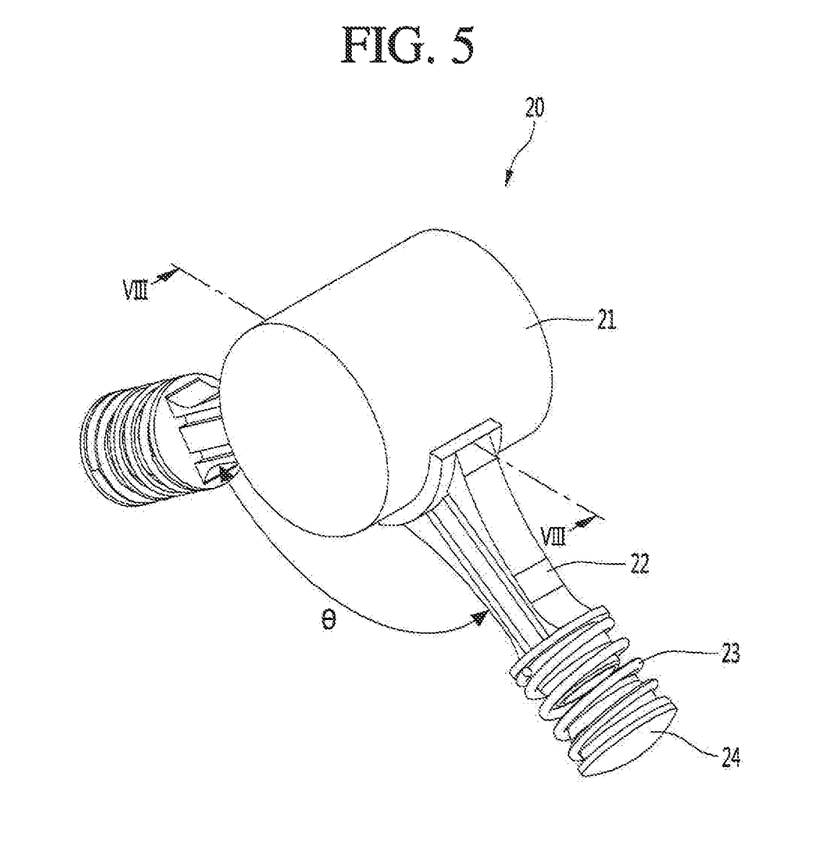
FIG. 5 is a front perspective view of a first support device that supports a front end of the compressor lain body of the linear compressor according to an embodiment.
Figure 6:
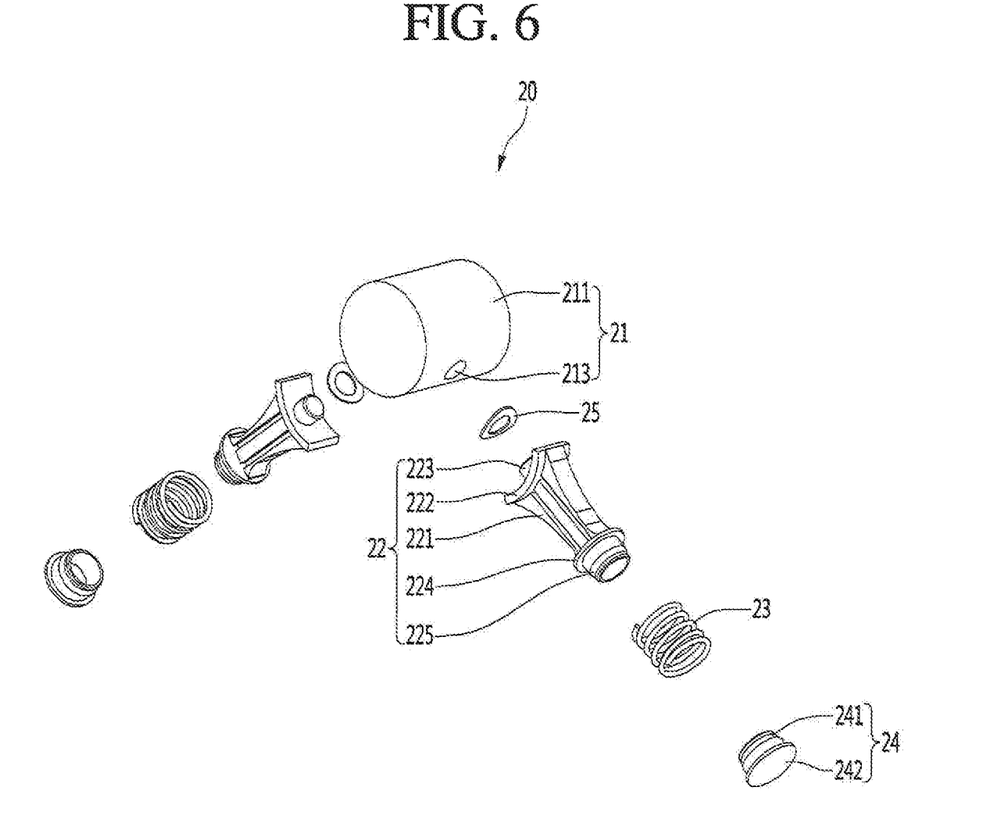
FIG. 6 is a front exploded perspective view of the first support device of FIG. 15.
Figure 7:
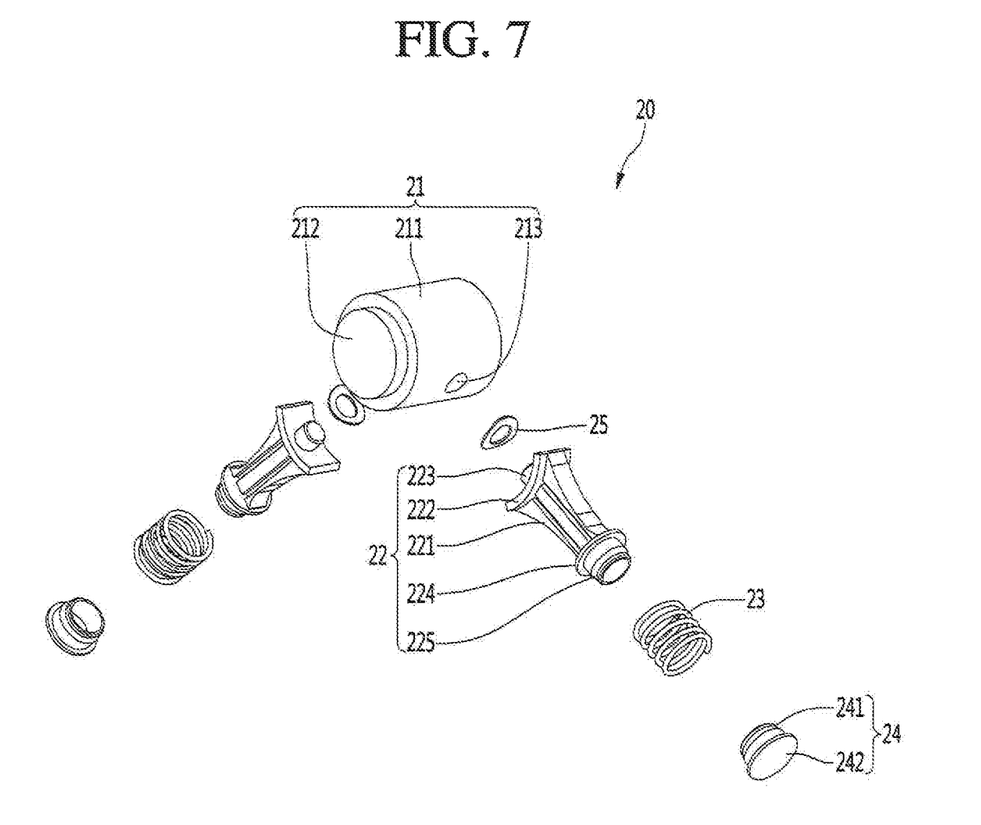
FIG. 7 is a rear exploded perspective view of the first support device of FIG. 5.
Figure 8:
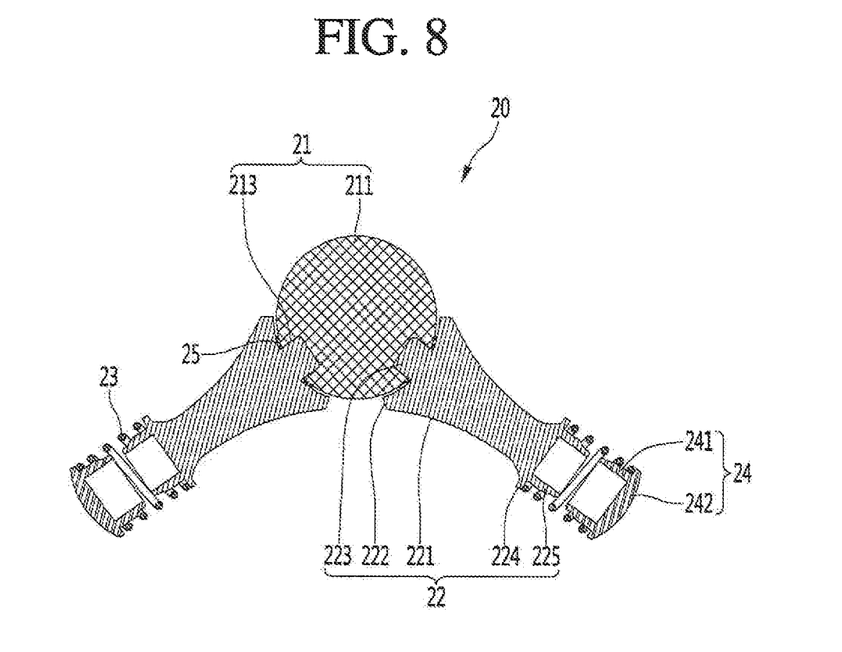
FIG. 8 is a longitudinal cross-sectional view of the first support device, taken along line VIII-VIII of FIG. 5.

FIG. 5 is a front perspective view of a first support device that supports a front end of the compressor main body of the linear compressor according to an embodiment. FIG. 6 is a front exploded perspective view of the first support device of FIG. 5. FIG. 7 is a rear exploded perspective view of the first support device of FIG. 5 FIG. 8 is a longitudinal cross-sectional view of the first support device, taken along line VIII-VIII of FIG. 5.

Referring to FIGS. 5 to 8, the first support device 20 according to an embodiment may include a support head 21 coupled to a front center of the discharge cover 190, and a pair of damping units or dampers fitted into the support head 211. The support head 21 may include a head body 211 having a cylindrical shape, and an insertion protrusion 212 that protrudes from a rear surface of the head body 211. The insertion protrusion 212 may have a diameter smaller than a diameter of the support head 21 and be inserted into and fixed to an insertion groove or an insertion hole defined in the front center of the discharge cover 190.

A pair of coupling grooves 213 that couples to the pair of damping units may be defined in a side surface of the head body 211, that is, a surface forming a cylindrical part or portion (hereinafter, defined as "the circumferential surface"). The pair of coupling grooves 213 may be defined at positions spaced apart along the circumferential surface of the head body 211 by a predetermined angle.

The pair of damping units may be respectively connected to the pair of coupling grooves 213 in a tangential direction perpendicular to the circumferential surface of the head body 211. An angle θ between the pair of damping units may, be in a range of about 90 degrees to about 120 degrees, for example, 108 degrees.

Each of the pair of damping units may include a support leg 22, a buffer pad 25 disposed on the support leg 22 and closely contacting the support leg 22, an elastic member 23 having one or a first end fitted into a bottom end of the support leg 22, and a shell seat 24 fitted into the other or a second end of the elastic member 23 and seated on the inner circumferential surface of the shell 101. The elastic member 23 may include a coil spring, and the buffer pad 25 may be made of rubber, silicone, or a plastic material, for example.

The support leg nay may include a leg body 221, a head support part or support 222, a mounting protrusion 223, a flange 224, and an extension part or extension 225. The head support part 222 may be rounded at an upper end of the leg body 221 at a curvature corresponding to a curvature of a circumferential surface of the head body 211 and come into close contact with the circumferential surface of the head body 211.

The mounting protrusion 223 may protrude from an upper center of the head support part 222 to a predetermined length and be inserted into the coupling groove 213 of the head body 211. The flange 224 may extend from a lower end of the leg body 221 in a circular rib shape. The extension part 225 may extend from a bottom surface of the flange 224 and have a diameter smaller than a diameter of the flange 224 and a predetermined length, and may extend in a hollow sleeve shape.

The extension part 225 may be inserted into the elastic member 23, and one end of the elastic member 23 may be seated on the flange 224.

The shell seat 24 may include a bottom part or portion 242 that comes into close contact with the inner circumferential surface of the shell 101, and a support sleeve 241 that extends from the upper surface of the bottom part 242. The support sleeve 241 may be inserted into the elastic member 23, and the other end of the elastic member 23 may be seated on the upper surface of the bottom part 242. The bottom surface of the bottom part 242 may be rounded to be convex at a center thereof.

A through-hole may be defined at the center of the buffer pad 25 such that the mounting protrusion 223 may pass therethrough. The buffer pad 25 may have a same shape and size as the upper surface of the head support part 222. In other words, when the buffer pad 25 is fitted into the mounting protrusion 223, the upper surface of the head support part 222 may be completely covered by the buffer pad 25. In this embodiment, the buffer pad 25 may have a rectangular shape in which a through-hole is defined in a center, but may also have an elliptical or circular ring shape.

When the extension part 225 of the support leg 22 and the support sleeve 241 of the shell seat 24 are inserted into both ends of the elastic member 23, the extension part 225 and the support sleeve 241 maintain a state of not contacting each other and being spaced apart from each other. When the linear compressor 10 is driven and vibration is transferred to, the support head 21, an operation in which the extension part 225 and the support sleeve 241 become close and far away may be repeated due to the elastic action of the elastic member 23.

Even if vibration occurrence, it is desirable to appropriately set an elastic coefficient of the elastic member 23 so as not to generate impact noise due to contact between the extension part 225 and the support sleeve 241. Also, as the pair of damping units connect the support head 21 and the shell 101 in an inverted "V" shape as shown in the drawings, the compressor main body itself may be stably supported, and the damping units and the support head 21 may be stably connected together without us in g a coupling member, such as a screw. Further, separate coupling members are not required in the coupling portions between the damping units and the shell 101.

In order to mount the damping units, the compressor main body in which the support head 21 is coupled to the front center may be inserted into the shell. The rear end of the compressor main body may be coupled to the first shell cover 102. In this state, the buffer pad 25 may be fitted into the mounting protrusion 223 and then the mounting protrusion 223 may be inserted into the coupling groove 213 of the support head 21. The elastic member 23 may be mounted on the lower end of the support leg 22, and the shell seat 24 may be fitted into the other end of the elastic member 23 in a state where the elastic member 23 is contracted.

In this state, if the pressing force of contracting the elastic member 23 is removed, the elastic member 23 may be restored to the original position and the bottom part 242 of the shell seat 24 comes into close contact with the inner circumferential surface of the shell 101. At this time, as the bottom surface of the bottom part 242 is convexly rounded at the center portion thereof, the bottom center portion of the bottom part 242 comes into contact with the inner circumferential surface of the shell 101. The state where the bottom center portion of the bottom part 242 comes into contact with the inner circumferential portion of the shell 101 may be said to be the optimal state where vibration and noise of the compressor may be best absorbed.

A linear compressor including the foregoing components according to embodiments may have at least following advantages.

First, as the front end of the compressor main body is supported by the coil spring, a noise and vibration absorption capability is improved. Second, as compared with the plate spring support structure, the number of components for assembling is reduced by half or more, thereby reducing manufacturing costs and an assembling processes. Third, as the support device tightly contacts the shell without any separate coupling member, the bolt coupling fault does not occur, thereby significantly reducing an assembling fault rate.

Embodiments disclosed herein provide a linear compressor that may include a shell having a cylindrical shape; a compressor main body inserted into the shell; a first shell cover coupled to a rear end of the shell; a first support device or support coupled to a front end of the compressor main body and supporting the front end of the compressor main body; and a second support device or support that couples a rear end of the compressor main body to the first shell cover and supports the rear end of the compressor main body. The first support device may include a support head coupled to a center of the front end of the compressor main body, and a pair of damping units or dampers having both ends respectively coupled to the support head and an inner circumferential surface of the shell.

One or more embodiments are set forth in the drawings and description. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A linear compressor, comprising:
   a shell, a central axis of which extends horizontally, having a cylindrical shape and having a front end and a rear end;
   a compressor main body received in the shell and including a discharge cover that defines a discharge space for accommodating gas compressed with high pressure, the discharge cover configured to define a front end portion of the compressor main body;
   a first shell cover coupled to the rear end of the shell;
   a second shell cover coupled to the front end of the shell;
   a first support coupled to a front end of the discharge cover; and
   a second support configured to couple a rear end of the compressor main body to a central portion of the first shell cover, wherein the first support comprises:
      a support head coupled to a center of the front end of the discharge cover; and
      a pair of dampers including a first damper and a second damper, wherein each of the first damper and the second damper extends from a side surface of the support head in a radial direction of the shell such that ends of the first damper and the second damper contact an inner circumferential surface of the shell, and wherein a central axis of the first damper and a central axis of the second damper are configured to be circumferentially spaced apart from each other by an angle less than 180 degrees and greater than 0 degree;
   wherein the support head comprises:
      a head body;
      an insertion protrusion that protrudes from a rear surface of the head body and coupled to the center of the front end of the discharge cover; and
      a pair of coupling grooves defined in an outer circumferential surface of the head body.

2. The linear compressor according to claim 1, wherein the pair of dampers is coupled to the support head in an inverted "V" shape extending at a predetermined angle in a circumferential direction of the support head.

3. The linear compressor according to claim 2, wherein the predetermined angle between the pair of dampers is in a range of 90 degrees to 120 degrees.

4. The linear compressor according to claim 3, wherein the predetermined angle between the pair of dampers is 108 degrees.

5. The linear compressor according to claim 1, wherein each of the pair of dampers comprises:
   a support leg;
   a buffer pad disposed between an upper end of the support leg and the head body;
   an elastic member having a first end seated on a lower end of the support leg; and
   a shell seat coupled to a second end of the elastic member.

6. The linear compressor according to claim 5, wherein the support leg comprises:
   a leg body that extends a predetermined length;
   a head support rounded at an upper end of the leg body so as to contact the outer circumferential surface of the head body; and
   a mounting protrusion that protrudes from a center of the head support, and wherein the mounting protrusion passes through the buffet pad and is inserted into the coupling groove of the head body.

7. The linear compressor according to claim 6, wherein the buffer pad has a same shape and size as an upper surface of the head support.

8. The linear compressor according to claim 6, wherein the buffer pad comprises a circular or elliptical pad.

9. The linear compressor according to claim 6, wherein the support leg further comprises:
   a flange disposed at a lower end of the leg body; and
   an extension that extends from a bottom surface of the flange, and wherein the extension is inserted into the elastic member such that the first end of the elastic member is seated on the flange.

10. The linear compressor according to claim 6, wherein the shell seat comprises:
    a bottom portion in contact with the inner circumferential surface of the shell; and
    a support sleeve that extends from an upper surface of the bottom portion and is inserted into the elastic member.

11. The linear compressor according to claim 10, wherein a bottom surface of the bottom portion is convexly rounded at a center thereof.

12. The linear compressor according to claim 5, wherein the elastic member is a coil spring.

13. The linear compressor according to claim 1, wherein the first shell cover includes:
    a cover support provided on an inner surface of the central portion of the first shell cover; and
    a stopper provided at a peripheral portion of the first shell cover, and wherein the stopper prevents the compressor main body from being bumped by the shell.

14. The linear compressor according to claim 13, wherein the second support includes a support spring coupled to the cover support to elastically support the compressor main body.

15. The linear compressor according to claim 1, further including:
    a suction pipe coupled to the first shell cover through which gas is suctioned into the shell; and a discharge pipe coupled to an outer circumferential surface of the shell through which the compressed gas from the discharge space of the discharge cover is discharged.

16. The linear compressor according to claim 15, wherein the discharge pipe is coupled to the shell adjacent the second shell cover.

* * * * *